(12) United States Patent
Takeuchi et al.

(10) Patent No.: US 8,212,446 B2
(45) Date of Patent: Jul. 3, 2012

(54) BRUSHLESS ELECTRIC MACHINE AND DEVICE COMPRISING SAID MACHINE

(75) Inventors: Kesatoshi Takeuchi, Shiojiri (JP);
Kazuyoshi Nakamura, Azumino (JP);
Mamoru Sugimoto, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/548,497

(22) Filed: Aug. 27, 2009

(65) Prior Publication Data
US 2010/0052458 A1    Mar. 4, 2010

(30) Foreign Application Priority Data

Aug. 29, 2008  (JP) ................................ 2008-220723
Mar. 5, 2009   (JP) ................................ 2009-052239

(51) Int. Cl.
*H02K 47/04*    (2006.01)
(52) U.S. Cl. ................. 310/156.37; 310/12.15
(58) Field of Classification Search .......... 310/112–114, 310/156.37, 12.15, 12.21, 12.22, 12.24
See application file for complete search history.

(56) References Cited

U.S. PATENT DOCUMENTS

| | | | | |
|---|---|---|---|---|
| 4,187,441 A | * | 2/1980 | Oney | 310/112 |
| 6,670,730 B2 | * | 12/2003 | Bartolotti | 310/12.15 |
| 6,864,601 B2 | * | 3/2005 | Sogard | 310/12.25 |
| 7,053,513 B2 | * | 5/2006 | Toujima et al. | 310/114 |
| 7,479,722 B2 | * | 1/2009 | Takeuchi et al. | 310/113 |
| 7,501,733 B2 | * | 3/2009 | Takeuchi | 310/156.35 |
| 7,777,381 B2 | * | 8/2010 | Takeuchi | 310/112 |
| 2004/0061397 A1 | | 4/2004 | Rose | 310/156.37 |
| 2005/0275359 A1 | * | 12/2005 | Takeuchi et al. | 318/138 |
| 2007/0046124 A1 | * | 3/2007 | Aydin et al. | 310/156.37 |

FOREIGN PATENT DOCUMENTS

JP    2001-298982    10/2001

* cited by examiner

*Primary Examiner* — Dang Le
(74) *Attorney, Agent, or Firm* — Harness, Dickey & Pierce, P.L.C.

(57) ABSTRACT

To provide a technique that improves an efficiency of using a magnetic field in a brushless electric machine. A brushless electric machine includes a first member having N sets (N is an integer of 2 or more) of electromagnetic groups, and a second member that has N+1 sets of magnetic field forming member groups and can move in a predetermined moving direction in relative to the first member. One set of the electromagnetic coil group and one set of the magnetic field forming member group are alternately disposed along a direction perpendicular to the moving direction.

5 Claims, 16 Drawing Sheets

FIRST EXAMPLE OF MANUFACTURING METHOD
OF ELECTROMAGNETIC COIL HAVING SLOT YOKE

SECOND EXAMPLE OF MANUFACTURING METHOD
OF ELECTROMAGNETIC COIL HAVING SLOT YOKE

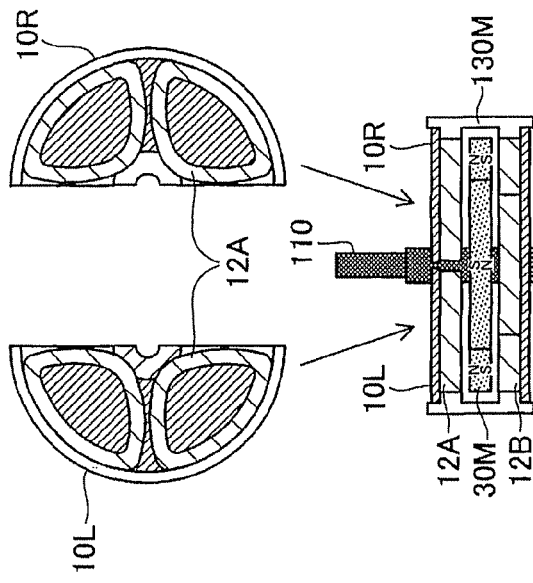
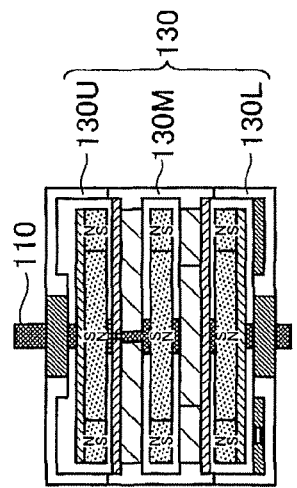
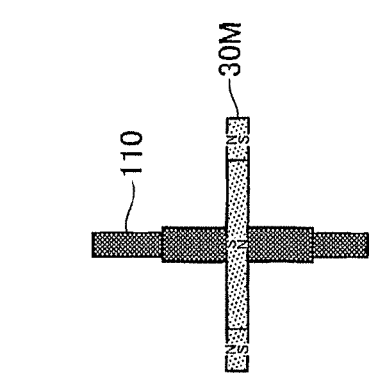
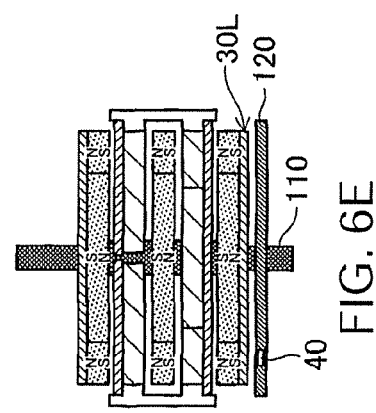
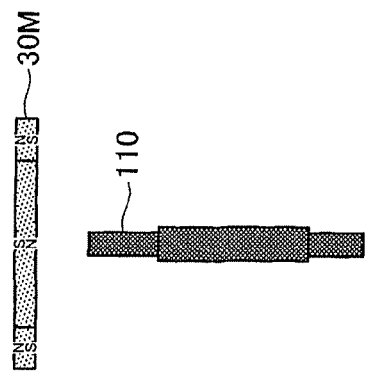
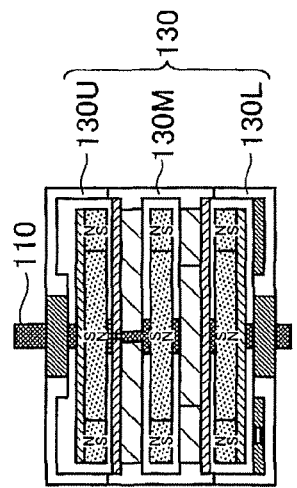
FIG. 6A  FIG. 6B  FIG. 6C
FIG. 6D  FIG. 6E  FIG. 6F

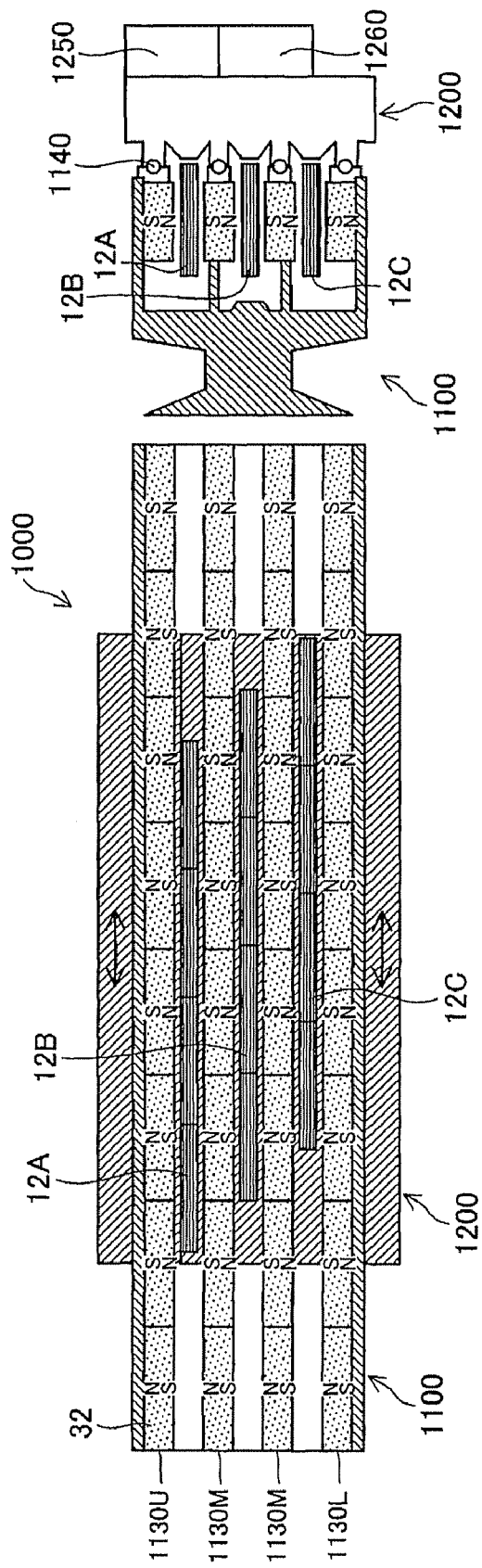

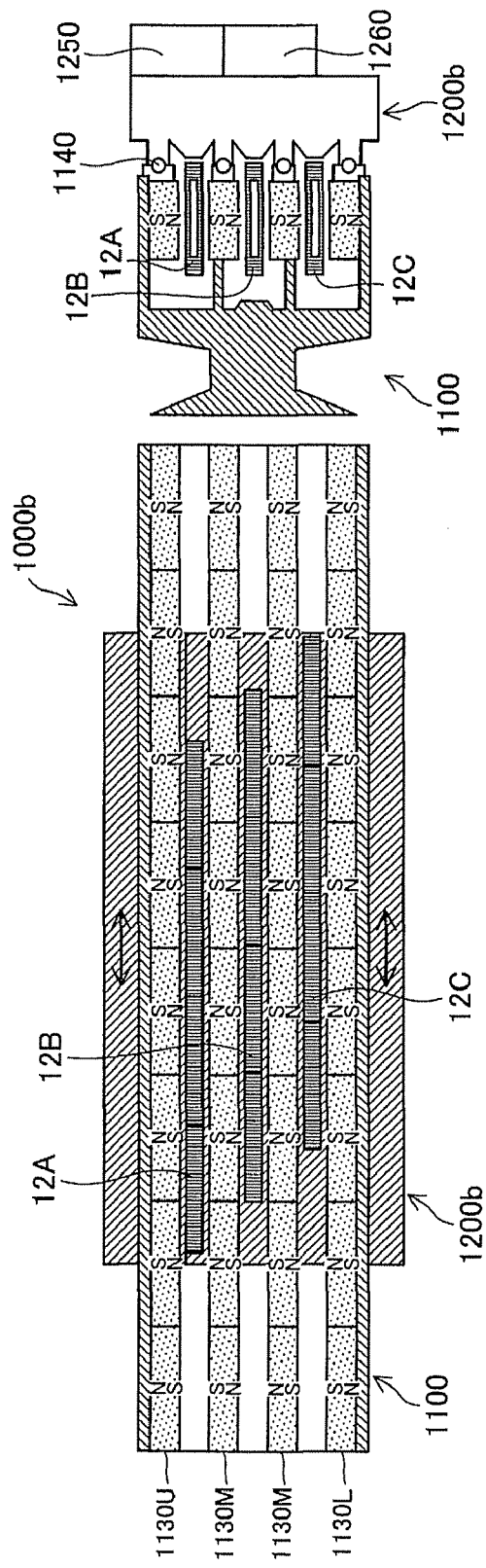

BRUSHLESS ELECTRIC MACHINE AND DEVICE COMPRISING SAID MACHINE

TECHNICAL FIELD

The present invention relates to a brushless electric machine utilizing a permanent magnet and an electromagnetic coil.

BACKGROUND TECHNOLOGY

A brushless motor described in Japanese Unexamined Patent Application Publication No. 2001-298982 is known as an example of brushless electric machines utilizing permanent magnets and electromagnetic coils.

FIG. 21 is a conceptual view showing a structural example of a related art brushless motor. This brushless motor includes an electromagnetic coil array 12 and a magnet array 32. A magnetic field is exemplified near the magnet array 32. The related art brushless motor has a problem in that the efficiency of using the magnetic field of the electromagnetic coil array 12 is considerably low because of an open magnetic field of the permanent magnets. This problem is involved not in only motors but also in generators, and is generally common to brushless electric machines.

SUMMARY OF THE INVENTION

The invention aims to provide a technique to improve efficiency of using a magnetic field in a brushless electric machine.

The invention intends to solve at least part of the above problem, and can be realized by the following configurations or application examples.

APPLICATION EXAMPLE 1

A brushless electric machine includes a first member that includes N sets (N is an integer of 1 or more) of electromagnetic coil groups, and a second member that includes N+1 sets of magnetic field forming member groups having at least one set of a permanent magnet group and can move in a predetermined moving direction in relative to the first member.

Along a direction perpendicular to the moving direction, the electromagnetic coil group and the magnetic field forming member group.

The structure can improve efficiency of using a magnetic field since an arbitrary one set of the electromagnetic coil group is sandwiched between two sets of the magnetic field forming member groups, enabling the magnetic field at the position of the electromagnetic coil to be intensified. In addition, the distance between the magnetic field forming member groups can be shortened as compared with a case where a plurality of sets of the electromagnetic coil groups is disposed between the magnetic field forming member groups since one set of the electromagnetic coil group and one set of the magnetic field forming member group composed of the permanent magnets and the like are alternately disposed. Consequently, the efficiency of using the magnetic field of the permanent magnets can be increased, and torque can be increased.

APPLICATION EXAMPLE 2

In the brushless electric machine according to the application example 1, all of the N+1 sets of the magnetic field forming member groups are the permanent magnet groups.

The structure can generate high torque since all of the N+1 sets of the magnetic field forming members are the permanent magnet groups, enabling a strong magnetic filed to be generated at the position of the electromagnetic coil group. As a result, high torque can be generated.

APPLICATION EXAMPLE 3

In the brushless electric machine according to the application example 2, the integer N is 2 or more.

In this case, the effect of increasing torque is markedly demonstrated.

APPLICATION EXAMPLE 4

In the brushless electric machine according to the application example 2 or 3, each electromagnetic coil is wound around an axis that is in parallel with a direction passing through the first member and the second member, and is perpendicular to the moving direction; and any 2 sets of the permanent magnet groups adjacent to each other among the N+1 sets of the permanent magnet groups are disposed so that different magnetic poles face to each other sandwiching one set of the electromagnetic coil group.

The structure can improve the efficiency of using a magnetic field since the permanent magnet groups are disposed so that the different magnetic poles face to each other sandwiching the one set of the electromagnetic coil group, resulting in the magnetic field at the position of the magnetic coil group to be nearly a straight line.

APPLICATION EXAMPLE 5

In the brushless electric machine according to the application example 2 or 3, each electromagnetic coil is wound around an axis that is perpendicular to a direction passing through the first member and the second member, and is in parallel with the moving direction; and any 2 sets of the permanent magnet groups adjacent to each other among the N+1 sets of the permanent magnet groups are disposed so that same magnetic poles face to each other sandwiching one set of the electromagnetic coil group.

According to the structure, a first coil section and a second coil section can be pictured. Viewed from an axis around which the electromagnetic coil is wound, the first coil section is near the permanent magnet at one side while the second coil section is near the permanent magnet at the other side. Driving force is generated from the first and the second coil section in the same direction. The electromagnetic coil, thus, can be efficiently utilized.

APPLICATION EXAMPLE 6

The brushless electric machine according to any of application examples 1 through 5 further includes: a position sensor that is provided to the first member and detects a relative position of the first and the second members; and a control circuit that controls the brushless electric machine by utilizing an output signal of the position sensor.

The invention can be embodied in various ways. For example, it can be embodied as a brushless motor, a brushless electric generator, a control method thereof (or driving method), an actuator or generating equipment using the same.

BRIEF DESCRIPTION OF THE DRAWINGS

FIGS. 6A through 6D are explanatory views showing an example of an assembly method of the motor shown in FIG. 5.

FIGS. 10A and 10B are sectional views showing a structure of a linear motor according to the first embodiment.

FIGS. 13A and 13B are sectional views showing a structure of a linear motor according to the second embodiment.

DESCRIPTION OF EMBODIMENTS

Figure 1A:
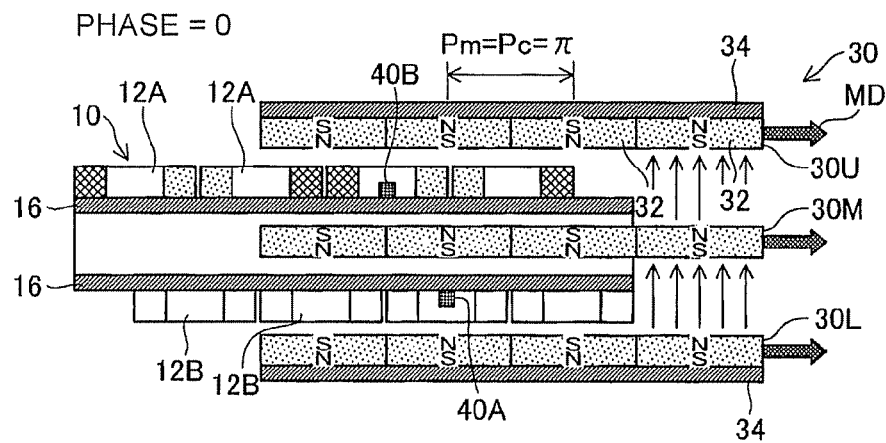
FIGS. 1A, 1B and 1C are explanatory views showing a structure and an operation of a two-phase brushless motor according to a first embodiment of the invention.
Figure 1B:
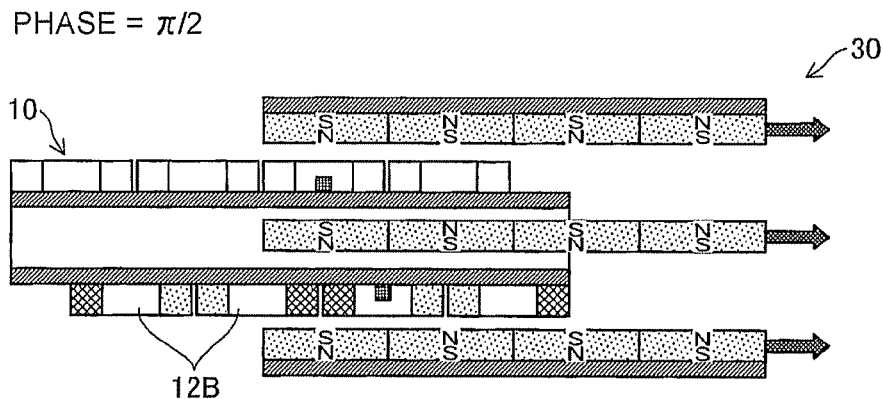
Figure 1C:
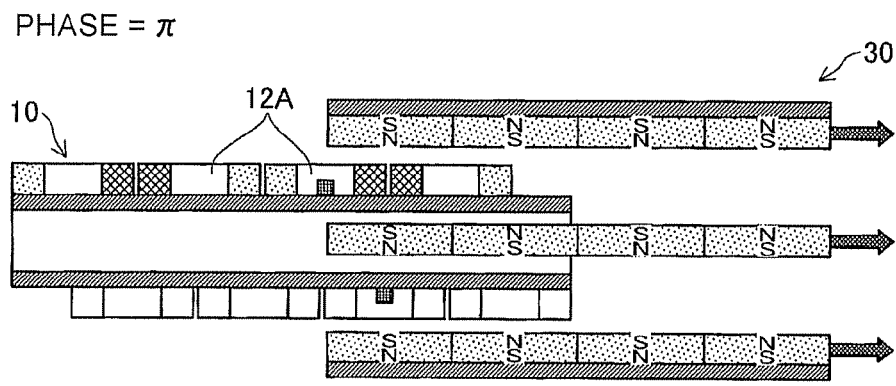

Next, embodiments of the invention will be described in the following order.
A. First Embodiment:
B. Second Embodiment:
C. Structure of Driving Circuit:
D. Modification Examples:
A. First Embodiment:

FIGS. 1A to 1C are explanatory views showing a structure and an operation of a brushless motor according to a first embodiment of the invention. A motor body of the motor includes a first member 10 and a second member 30 both of which can relatively move. For example, the first member 10 is a stator while the second member 30 is a rotor. In the explanation on FIG. 1, the first member 10 is called as a "stator section 10," while the second member 30 is called as a "rotor section 30."

The rotor section 30 includes an upper rotor section 30U, a central rotor section 30M, and a lower rotor section 30L. The three rotor sections 30U, 30M, and 30L are coupled to each other, and move together along a predetermined moving direction MD (a left-right direction in FIG. 1A). Each of the rotor sections 30U, 30M, and 30L is provided with one set of a permanent magnet group (also called as a "permanent magnet array") composed of a plurality of permanent magnets 32. Each of the permanent magnets 32 is magnetized in a direction perpendicular to the moving direction MD of the rotor section 30. The permanent magnets 32 included in the same one set of the permanent magnet group are disposed along the moving direction MD of the rotor section 30. Here, it is preferable that the central rotor section 30M is not provided with a magnet yoke, while outer faces of the upper rotor section 30U and the lower rotor section 30L are preferably provided with magnet yokes 34 made of a ferromagnetic material. The magnet yoke 34 enables a magnetic field at a position of an electromagnetic coil to be more strengthened and a leak of the magnetic field to an outside from the motor to be reduced. The magnet yoke 34, however, may be omitted. A polar anisotropy magnet can be used as the permanent magnet 32. In this case, the magnet yoke 34 can be omitted.

On a support member 16 of the stator section 10, disposed are an A-phase electromagnetic coil 12A and a B-phase electromagnetic coil 12B. More specifically, a plurality of the A-phase electromagnetic coils 12A is disposed between the upper rotor section 30U and the central rotor section 30M while a plurality of the B-phase electromagnetic coils 12B is disposed between the central rotor section 30M and the lower rotor section 30L. Each of the electromagnetic coils 12A and 12B is wound around an axis that is in parallel with a direction passing through the stator section 10 and the rotor section 30 (up-down direction in the figure), and is perpendicular to the moving direction MD. The stator section 10 is, further, provided with an A-phase magnetic sensor 40A and a B-phase magnetic sensor 40B. The magnetic sensors 40A and 40B detect the position of the rotor section 30 (i.e., the phase of the motor). In this regard, the sensors 40A and 40B are also respectively called as an "A-phase sensor" and a "B-phase sensor", hereinafter. In stead of the magnetic sensor, other kinds of position sensors, such as encoders, may be utilized.

The permanent magnets 32 are disposed with a constant magnetic pole pitch Pm. The A-phase coils 12A are disposed with a constant pitch Pc. The adjacent coils are excited in opposite directions. The B-phase coils 12B are also disposed in the same manner. In the embodiment, the magnetic pole pitch Pm is equal to the coil pitch Pc, and corresponds to $\pi$ in an electric angle. Here, an electric angle of $2\pi$ corresponds to a mechanical angle or a distance in a movement in the case that the phase of a driving signal is changed by $2\pi$. In the embodiment, in the case that the phase of the driving signal is changed by $2\pi$, the rotor section 30 moves twice as much as the magnetic pole pitch Pm. The A-phase coil 12A and the B-phase coil 12B are disposed with a difference of $\pi/2$ in a phase between the positions.

In the motor body, the one set of the permanent magnet group and the one set of the electromagnetic coil group are alternately disposed along the direction perpendicular to the moving direction MD of the rotor section 30 (up-down direction in FIG. 1). That is, the one set of the permanent magnet group 32 on the upper rotor section 30U, the A-phase coils 12A, the one set of the permanent magnet group 32 on the central rotor section 30M, the B-phase coils 12B, and the one set of the permanent magnet group 32 on the lower rotor section 30L are disposed in this order from the top of FIG. 1A. In addition, the permanent magnets 32 in the three rotor sections 30U, 30M, and 30L are disposed so that different magnetic poles (N-pole and S-pole) face to each other with the one set of electromagnetic coil group sandwiched therebetween. Accordingly, a magnetic field between the magnets 32 adjacent in up and down is shown in roughly straight magnetic lines as shown at the right side in FIG. 1A. The magnetic field is closed between the permanent magnets 32. It can be understood that such closed magnetic field is stronger than the opened magnetic field shown in FIG. 19. Accordingly, the efficiency of using a magnetic field is increased, enabling motor efficiency to be improved. Additionally, in the embodiment, one set of the electromagnetic coil group for one phase is sandwiched by two sets of permanent magnet groups. This structure enables the distance between the two sets of permanent magnet groups to be more shortened as compared with a case where two sets of electromagnetic coil groups are disposed between the two set of permanent magnet groups. As a result, the magnetic field at the position of the electromagnetic coil can be more intensified, enabling torque to be increased.

FIGS. 1A to 1C show a normal rotation operation of the brushless motor of the embodiment. FIG. 1A shows a state at which the phase is 0. At the timing at which the phase is 0, the excitation direction of the B-phase coil 12B is reversed. The hatching of the coil part in the B-phase coil 12B is thus omitted. FIG. 1B shows a state at which the phase is π/2. At the timing at which the phase is π/2, the excitation direction of the A-phase coil 12A is reversed. The hatching of the coil part in the A-phase coil 12A is thus omitted. FIG. 1C shows a state at which the phase is π. At a timing at which the phase is π, the excitation direction of the B-phase coil 12B is reversed again. In this way, the excitation direction of one of the A-phase coil 12A and the B-phase coil 12B is alternately switched at every times at which the phase proceeds by π/2. In this regard, the operation after the phase of π is the same as described above. The description is thus omitted. In addition, reversing a current flowing in the coil can reverse the rotation of the motor.

Figure 2:
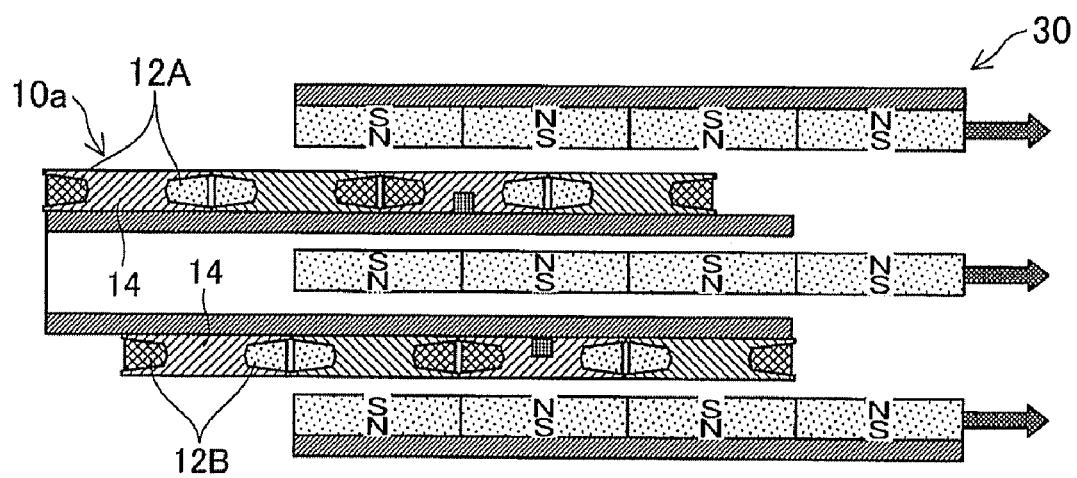
FIG. 2 is an explanatory view showing a structure of a motor body that is a modification example of the first embodiment.

FIG. 2 is an explanatory view showing a structure of a motor body that is a modification example of the first embodiment. This motor body has the structure in which the electromagnetic coils 12A and 12B having a slot yoke are employed in the motor body shown in FIG. 1. That is, in FIG. 2, each of the electromagnetic coils 12A and 1B is wound around a slot yoke 14. There is a difference in that a driving principle of a coreless motor without having a slot yoke such as shown in FIG. 1 is based on the Fleming's left-hand rule while the driving principle of a motor having a slot yoke such as shown in FIG. 2 is based on the Fleming's right-screw rule.

Figure 3A:
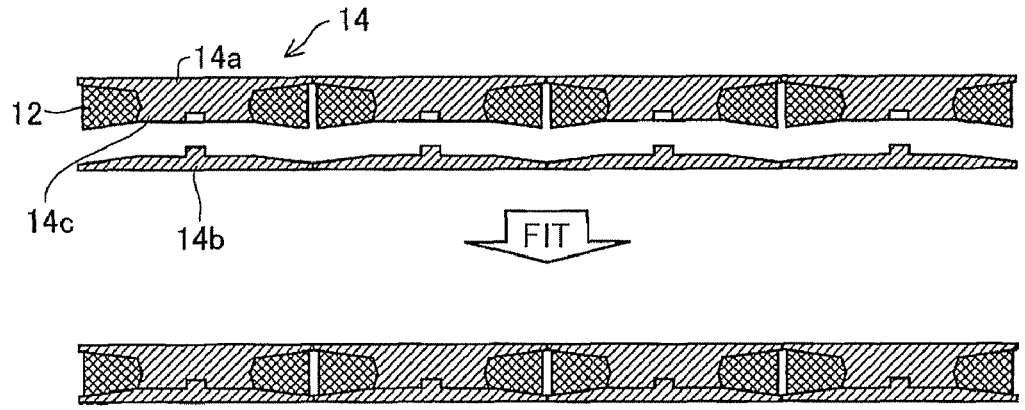
FIGS. 3A and 3B are explanatory views showing an example of a manufacturing method of an electromagnetic coil having a slot yoke.
Figure 3B:
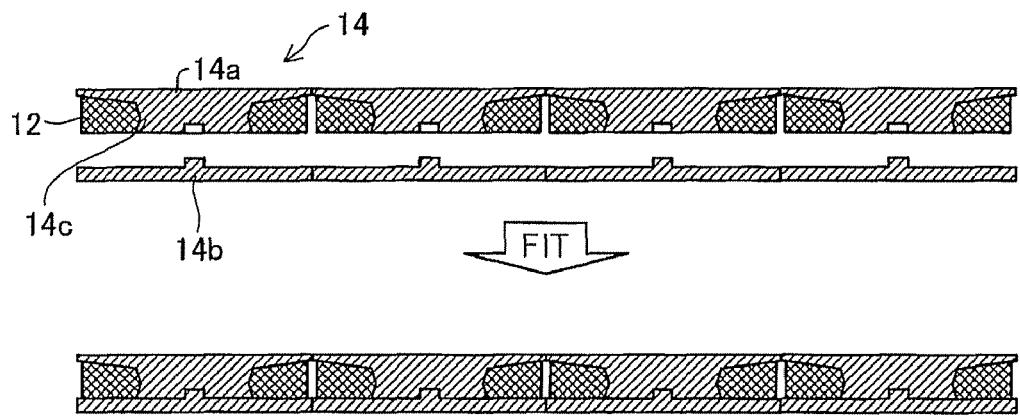

FIG. 3 is an explanatory view showing an example of a manufacturing method of the electromagnetic coil having the slot yoke. In an example shown in FIG. 3A, the slot yoke 14 is divided into a first yoke section 14a and a second yoke section 14b. The first yoke section 14a has a core section 14c. The core section 14c has a dowel hole formed at the center thereof to fit it with the second yoke section 14b together. A coil 12 is wound around the core section 14c. In this state, the second yoke section 14b is fitted with the first yoke section 14a. As a result, the electromagnetic coil having the slot yoke is completed. In FIG. 3A, the both ends of the second yoke section 14b are shaped in a slope. In contrast, in FIG. 3B, the both ends of the second yoke section 14b are shaped in a straight or a flat plate like. In this point, the structure of FIG. 3B is slightly different from the structure of FIG. 3A.

Figure 4:
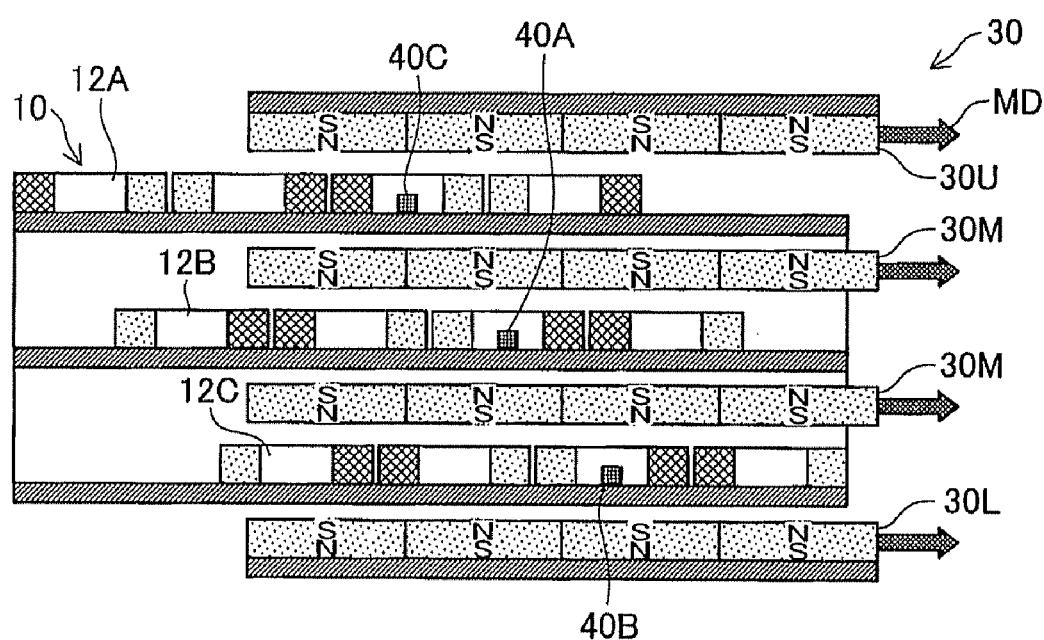
FIG. 4 is an explanatory view showing a three-phase brushless motor structure as another modification example of the first embodiment.

FIG. 4 is an explanatory view showing a three-phase brushless motor structure as another modification example of the first embodiment. As can be understood by comparing the structure of FIG. 1A, in the structure of FIG. 4, the stator section 10 includes three sets of coil groups, i.e., the A-phase coil group 12A, the B-phase coil group 12B, and the phase C coil group 12C, and the magnetic sensors 40A, 40B, and a magnetic sensor 40C for respective phases. The rotor section 30 includes the upper rotor section 30U, two pieces of the central rotor section 30M, and the lower rotor section 30L.

In the motor structure of FIG. 4, one set of the permanent magnet group and one set of the electromagnetic coil group are also alternately disposed along the direction perpendicular to the moving direction MD of the rotor section 30. In addition, the permanent magnets 32 in the four rotor sections, i.e., 30U, 30M, 30M, and 30L, are disposed so that different magnetic poles (N-pole and S-pole) face each other with the one set of electromagnetic coil group sandwiched therebetween. Further, one set of the electromagnetic coil group for one phase is sandwiched by two sets of the permanent magnet groups. This structure enables the distance between the two sets of the permanent magnet groups to be shortened, enabling torque to be increased.

Figure 5A:
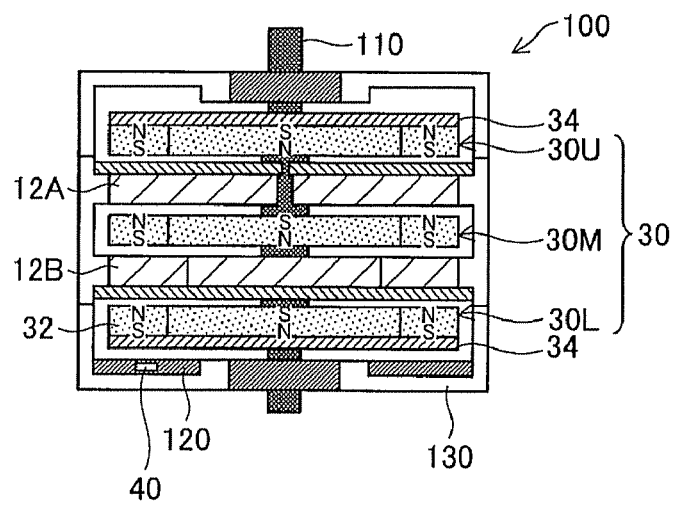
FIGS. 5A, 5B and 5C are sectional views showing a two-phase rotary motor utilizing the motor structure shown in FIG. 1.
Figure 5B:
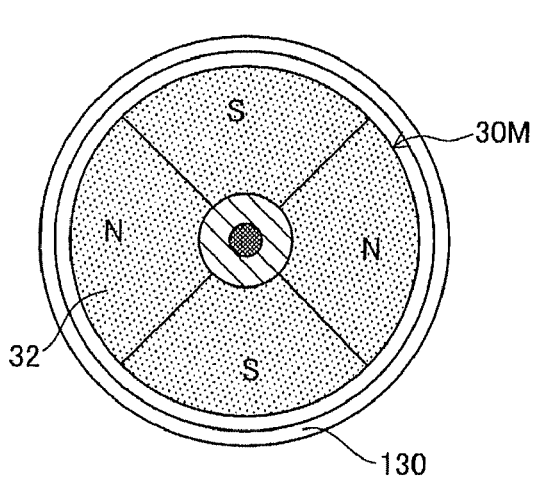
Figure 5C:
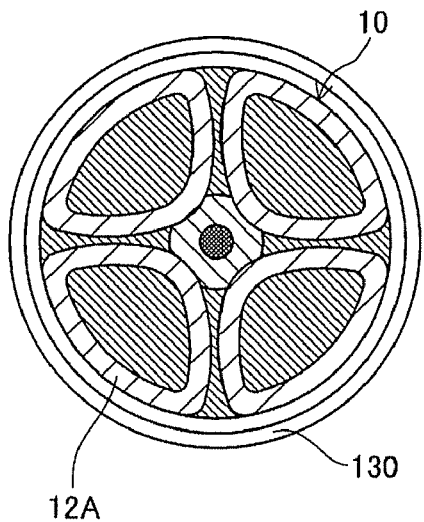

FIGS. 5A to 5C are sectional views showing a rotary motor utilizing the motor structure shown in FIG. 1. FIG. 5A shows a longitudinal sectional view of a motor body 100. The rotor section 30 is fixed to a rotational axis 110. The three rotor sections 30U, 30M, and 30L simultaneously rotate. The magnetization direction of each magnet 32 is a direction in parallel with the rotational axis 110.

FIG. 5B is a horizontal sectional view of the central rotor section 30M. The central rotor section 30M has four permanent magnets 32 each having a roughly fan shape. Since the upper rotor section 30U and the lower rotor section 30L have the same structure as the central rotor section 30M has, they are not shown in the figure. FIG. 5C is a horizontal sectional view of the stator section 10. The sartor section 10, as shown in FIG. 5A, includes a plurality of the A-phase coils 12A, a plurality of the B-phase coils 12B, and coils 12A and 12B thereof. In FIG. 1C, only the A-phase coils 12A are shown. In this example, four pieces of the A-phase coil 12A are provided, and each of the A-phase coils 12A is wound in a roughly fan shape. The B-phase coils 12B are also provided in the same manner. While the structure of four-pole motor is described here, increasing the number of poles can easily realize low rotation speed and high torque.

In FIG. 5A, a circuit substrate 120 is provided at a lower side of the lower rotor section 30L and inside a casing 130 of the motor. On the circuit substrate 120, disposed is a magnetic sensor 40. As the magnetic sensor 40, both the A-phase sensor 40A and the B-phase sensor 40B shown in FIG. 1A are provided. In FIG. 5A, however, they are not shown. The magnetic sensor 40 is disposed outside the magnet yoke 34 of the rotor section 30L. Accordingly, the magnetic field at the position of the magnetic sensor 40 is slightly weakened by the magnet yoke 34. Recently, one having a strong magnetic field has been frequently used for the permanent magnet 32. This may cause the magnetic field to be saturated over the detection range of the magnetic sensor 40. As a result, changes in the magnetic field may not be adequately detected. In contrast, as shown in FIG. 5A, providing the magnetic sensor 40 opposite the permanent magnet 32 with the magnet yoke 34 interposed therebetween has an advantage that it can reduce the intensity of the magnetic field at the magnetic sensor 40 and more precisely detect the changes in the magnetic field. As for the magnetic sensor 40, a hall element and a hall IC can be utilized. Particularly, the above advantage is remarkably exhibited when a sensor is used that outputs the intensity level of the magnetic field as a multiple-tone signal or an analog signal. Such magnetic sensor 40 generates a sensor output having a close similarity in a shape of a back electromotive force of the coil. Utilizing such magnetic sensor enables the motor to be more accurately driven or regenerated.

FIGS. 6A to 6F are explanatory views showing an example of an assembly method of the motor shown in FIG. 5. In FIGS. 6A and 6B, first, the rotational axis 110 is inserted into a center hole of the central rotor section 30M so as to fix the both. Then, as shown in FIG. 6C, the A-phase coil 12A is fixed to the upper part of the central rotor section 30M, and the B-phase coil 12B is fixed to the lower part of the central rotor section 30M. Here, the A-phase coil 12A and the B-phase coil 12B are respectively preliminary formed so as to be divided into stator coil sections 10L and 10R as shown at the upper part of FIG. 6C. The stator coil sections 10L and 10R are fixed to a central casing section 130M. As a result, the structure shown in FIG. 6C can be achieved. Thereafter, as shown in FIG. 6D, the upper rotor section 30U and the lower rotor section 30L are respectively fixed to the rotational axis 110. Then, as shown in FIG. 6E, the circuit substrate 120 is disposed to the lower side of the lower rotor section 30L. As shown in FIG. 6F, an upper casing section 130U and a lower casing section 130M are fixed to the central casing section 130M to complete the motor. In this regard, the steps of FIGS. 6E and 6F may be conducted in one common step.

Figure 7:
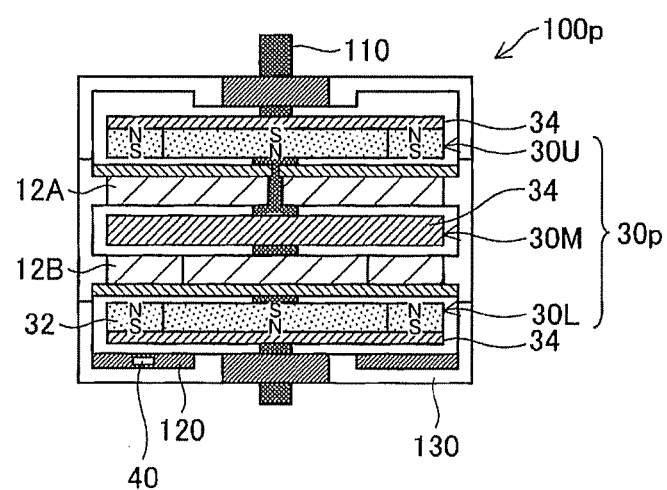
FIG. 7 is a sectional view showing a modification example of the two-phase rotary motor shown in FIG. 5.

FIG. 7 is a sectional view showing a modification example of the two-phase rotary motor shown in FIG. 5. A motor 100*p* has the same structure as the motor 100 in FIG. 5 has, and only differs from the motor 100 in FIG. 5 in that the central rotor section 30M is the magnet yoke 34, not the permanent magnets. In other words, the motor 100*p* has the structure in which the magnets 32 in the central rotor section 30M in FIG. 1 are replaced with the magnet yoke 34. The motor 100*p* also can realize a motor having a high efficiency of using a magnetic field based on nearly the same principle described in FIG. 1.

Figure 8:
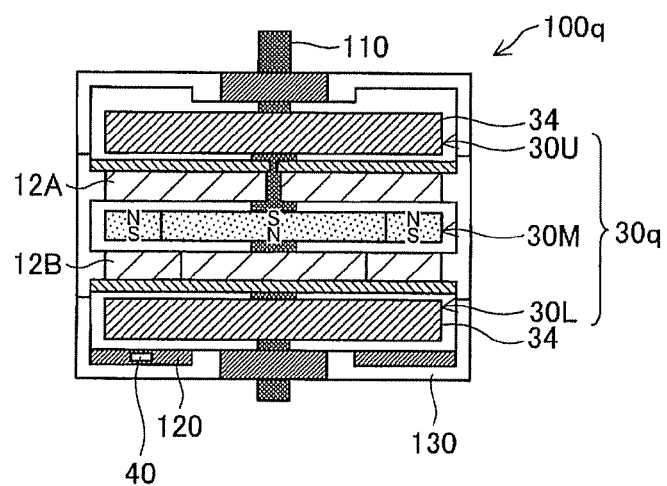
FIG. 8 is a sectional view showing another modification example of the two-phase rotary motor shown in FIG. 5.

FIG. 8 is a sectional view showing another modification example of the two-phase rotary motor shown in FIG. 5. The motor 100*p* has the same structure as the motor 100 in FIG. 5 has, and only differs from the motor 100 in FIG. 5 in that the upper rotor section 30U and the rotor section 30L are the magnet yokes 34, not the permanent magnets. In other words, the motor 100*q* has the structure in which the magnets 32 in the upper rotor section 30U and the lower rotor section 30L in FIG. 1 are replaced with the magnet yoke 34. The motor 100*q* also can realize a motor having a high efficiency of using a magnetic field based on nearly the same principle described in FIG. 1.

As can be understood from FIG. 7 and FIG. 8, replacing part of the plurality of sets of the permanent magnet groups with a magnet yoke group can achieve nearly the same effect. Here, the term "magnet yoke group" has broad meaning of not only a plurality of magnet yokes but also single magnet yoke. It can be understood that the permanent magnet and the magnet yoke have a commonality in terms of a magnetic field forming member generating a strong magnetic field (particularly parallel and straight magnetic field) as shown in FIG. 1. Among N+1 sets of the magnetic field forming member groups, at least one set is preferably the permanent magnet group. In a case where the magnet yoke group is included in the N+1 sets of the magnetic field forming member groups as the examples shown in FIGS. 7 and 8, the permanent magnet group is preferably disposed as the magnetic field forming member group adjacent to the upper side and the lower side of the magnet yoke group, whereas the magnet yoke group is not disposed.

Figure 9:
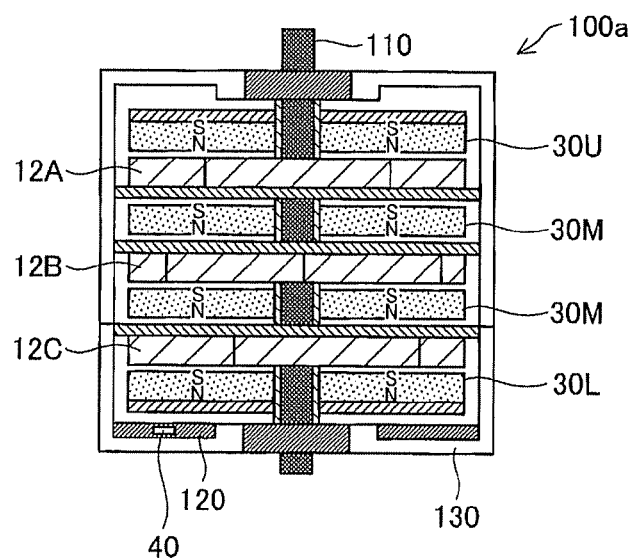
FIG. 9 is a sectional view showing a three-phase rotary motor according to the first embodiment.

FIG. 9 is a sectional view showing a further another rotary motor of the first embodiment. A rotary motor 100*a* is obtained by changing the motor 100 shown in FIG. 5 to a three-phase one, and corresponds to FIG. 4. In this way, the motor structure of the first embodiment can be applied to motors of three or more phases. The motor structure of the first embodiment also can be applied to single-phase motors.

FIG. 10 is a sectional view showing a structure of a linear motor according to the first embodiment. A linear motor 1000 includes a fixing guide section 1100 and a moving section 1200. As shown in FIG. 10A, the fixing guide section 1100 includes an upper guide section 1130U, two pieces of a central guide section 1130M, and a lower guide section 1130L. The guide sections 1130U, 1130M, and 1130L correspond to the rotor sections 30U, 30M, and 30L shown in FIG. 1. The guide sections, however, are fixed and do not move in FIG. 10. The permanent magnets 32 are disposed to the guide sections 1130U, 1130M, and 1130L along the moving direction of the linear motor. The moving section 1200 is provided with coil groups 12A, 12B, and 12C for three phases that are alternately disposed with four guide sections 1130U, 1130M, 1130M, and 1130L. The magnetic sensors for respective phases are not shown in the figure. As shown in FIG. 10B, the moving section 1200 is provided with a drive control section 1250 and a fuel battery 1260. The moving section 1200 is slidably held to the fixing guide section 1100 with a bearing section 1140. The first embodiment can also be realized as such linear motor. The linear motor also can be structured as a two-phase brushless motor.

Figure 11A:
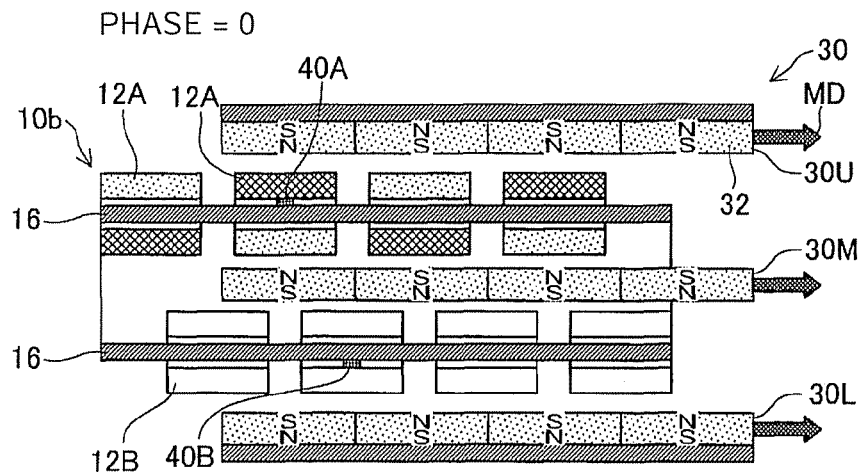
FIGS. 11A, 11B and 11C are explanatory views showing a structure and an operation of a brushless motor according to a second embodiment of the invention.
Figure 11B:
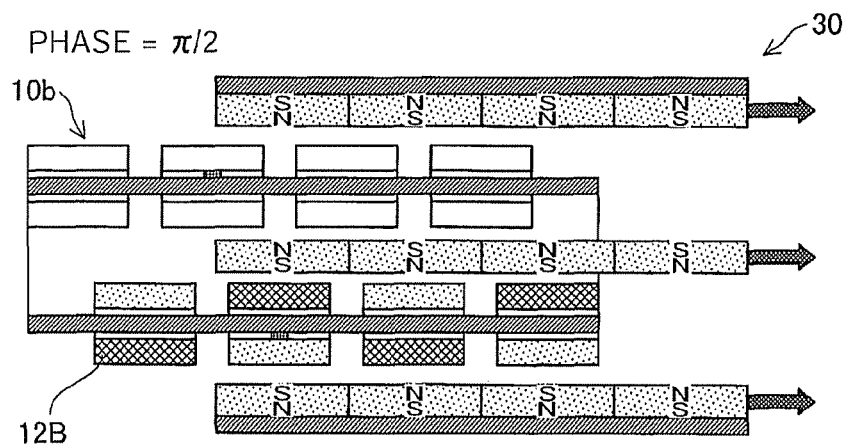
Figure 11C:
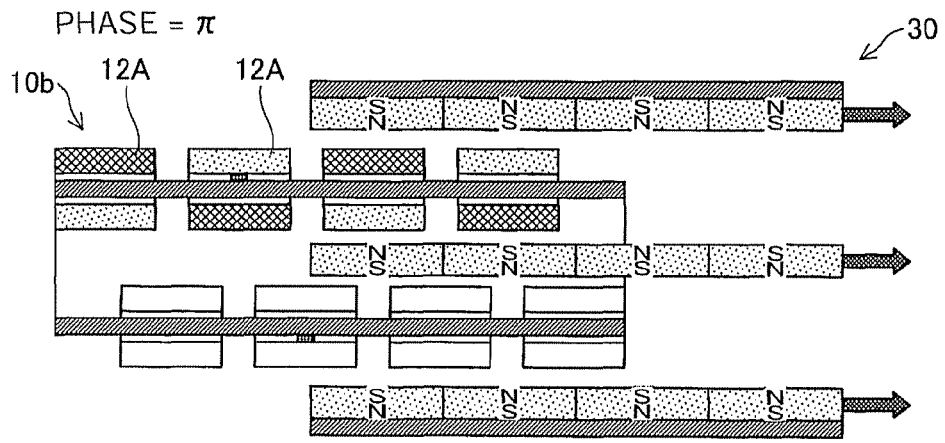

B. Second Embodiment:

FIGS. 11A to 11C are explanatory views showing a structure and an operation of a brushless motor according to a second embodiment of the invention. The structure of FIG. 11A differs from the structure of FIG. 1A in only an arrangement (winding way) of the electromagnetic coils and a direction of magnetic poles of the permanent magnets. That is, in FIG. 11A, the A-phase coil 12A is wound around an axis that is perpendicular to a direction passing through the rotor section 30 and the stator section 10*b* (up-down direction in the figure) and in parallel with the moving direction MD of the rotor section 30. This axis extends in a left-right direction in FIG. 11A. The B-phase coil 12B is also structured in the same manner. In addition, the permanent magnets 32 in the three rotor sections 30U, 30M, and 30L are disposed so that same magnetic poles (N-pole to N-pole and S-pole to S-pole) face each other with one set of the electromagnetic coil group sandwiched therebetween.

As for the coil sections of the coil 12A and the coil 12B, currents flow in the coil section at the upper side and the lower side of the supporting member 16 in opposite directions. For example, if a current flows, from a back side to a front side in the paper face, in the coil section at the upper side of one of the A-phase coils 12A, a current flows, from the front side to the back side of the paper face, in the coil section at the lower side. Incidentally, the directions of the magnetic fields in the coil sections at the upper side and the lower side of the coil 12A are opposite. A driving force, thus, is generated from the both coil sections in the same direction (a right-side force in an example of FIG. 11D). Accordingly, a driving force can be efficiently generated by utilizing both the lower side coil section and the upper side coil section of the individual coil. FIGS. 11A to 11C, which show the states at positions at which phases are 0, π/2, and π, are the same as those in FIGS. 1A to 1C. The description thereof is thus omitted. In this way, winding the electromagnetic coil around the axis in parallel with the moving direction MD can also efficiently generate an effective driving force along the moving direction MD.

Figure 12A:
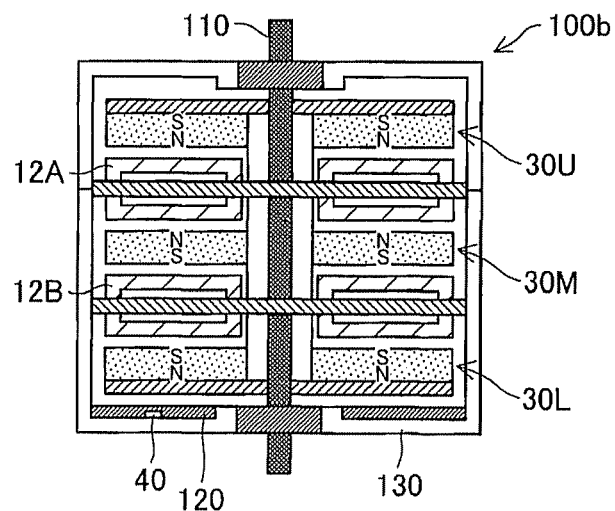
FIGS. 12A, 12B and 12C are sectional views showing a two-phase rotary motor utilizing the motor structure shown in FIG. 11.
Figure 12B:
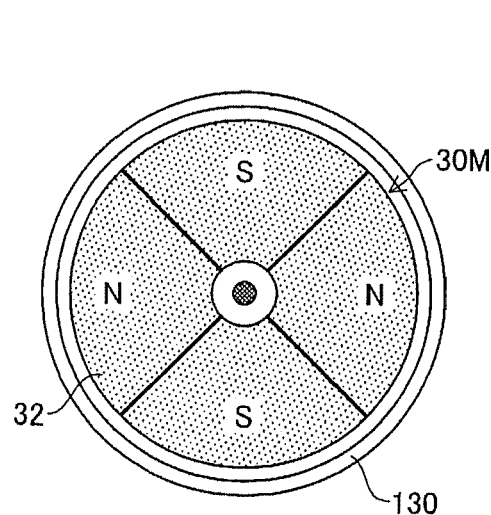
Figure 12C:
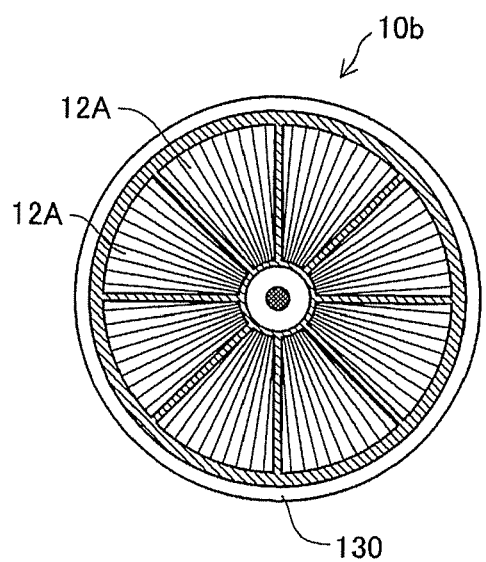

FIG. 12 is a sectional view showing a two-phase rotary motor utilizing the motor structure shown in FIG. 11, and corresponds to FIG. 5 of the first embodiment. Only the winding way of the electromagnetic coils 12A and 12B shown in FIGS. 12A and 12C, and the direction of the magnetic poles of the permanent magnet 32 shown in FIG. 12A are different from those in FIG. 5. That is, in a rotary motor 110b in FIG. 12, the center axes of the electromagnetic coils 12A and 12B are wound around an axis in parallel with a rotational direction (circular direction) of the rotor section 30. In addition, the permanent magnets 32 are disposed so that the same magnetic poles face to each other sandwiching the electromagnetic coil.

FIG. 13 is a sectional view showing a structure of the linear motor of the second embodiment, and corresponds to FIG. 10 of the first embodiment. Only the winding way of the electromagnetic coils 12A, 12B and 12C and the direction of the magnetic poles of the permanent magnet 32 shown in FIG. 13B are different from those in FIG. 10. That is, in a linear motor 1000b in FIG. 13, the center axes of the electromagnetic coils 12A and 12B are wound around an axis in parallel with a moving direction of a moving section 1200b. In addition, the permanent magnets 32 are disposed so that same magnetic poles face to each other sandwiching the electromagnetic coil.

In this way, in the second embodiment, the electromagnetic coils are respectively wound around the respective axes in parallel with the moving direction of the member of the motor. In addition, the permanent magnets are disposed so that the same magnetic poles face to each other sandwiching the electromagnetic coil. This structure also can exhibit nearly the same effect as that of the first embodiment.

As can be understood from various examples described above, in the embodiments of the invention, the structure can be adopted in which N sets (N represents integer numbers) of the electromagnetic coil groups and N+1 sets of the permanent magnet groups are provided, and one set of the electromagnetic coil group and one set of the permanent magnet group are alternately disposed along the direction perpendicular to the movement direction MD. Such structure has an advantage in that alternate arrangement of the one set of the electromagnetic group and the one set of the permanent magnet group can control the distance between the permanent magnet groups to be small. In order to realize such structure, it can be considered that a first member supporting the N sets of the electromagnetic coil groups includes the N number of supporting members each in which one set of the electromagnetic coil group is provided. Likewise, it can be considered that a second member supporting the N+1 sets of the permanent magnet groups includes the N+1 number of supporting members each in which one set of the permanent magnet group is provided.

In general, many motors are provided with electromagnetic coils of two or more phases. In this case, if all of the electromagnetic groups for a plurality of phases are disposed between two sets of the permanent magnet groups, the distance between the permanent magnet groups become large. This may cause torque to be lowered. In contrast, in the embodiment of the invention, one set of the electromagnetic coil group and one set of the permanent magnet group are alternately disposed even though a plurality of sets of the electromagnetic coil groups for the plurality of phases are used. This makes it possible to control the distance between the permanent magnets to be small, having a remarkable advantage in that torque can be increased.

Figure 14:
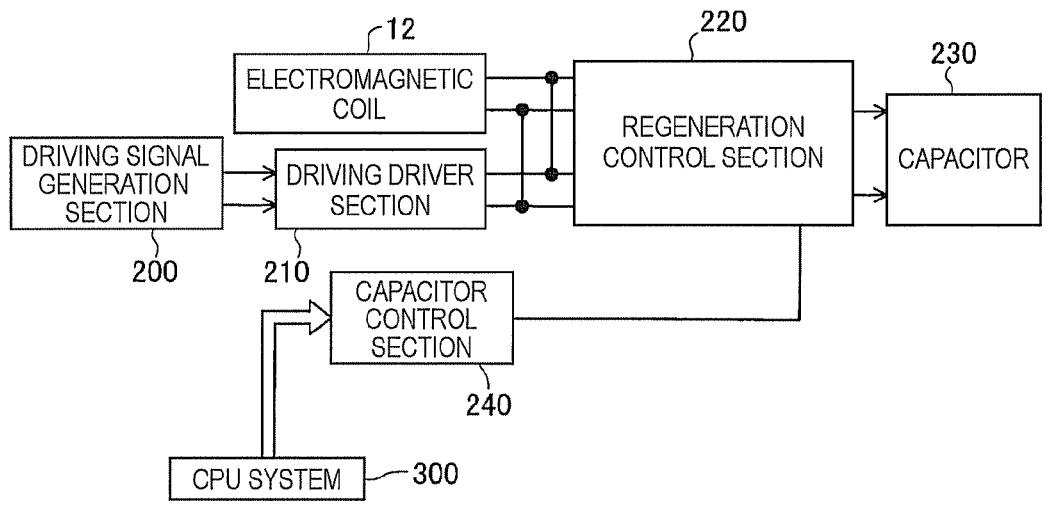
FIG. 14 is a block diagram showing a structure of a control circuit of a brushless electric machine.

C. Structure of Driving Circuit:

FIG. 14 is a block diagram showing a structure of a control circuit of a brushless electric machine. The control circuit includes a CPU system 300, a driving signal generation section 200, a driving driver section 210, a regeneration control section 220, a capacitor 230, and a capacitor control section 240. The driving signal generation section 200 generates a driving signal to be supplied to the driving driver section 210.

Figure 15:
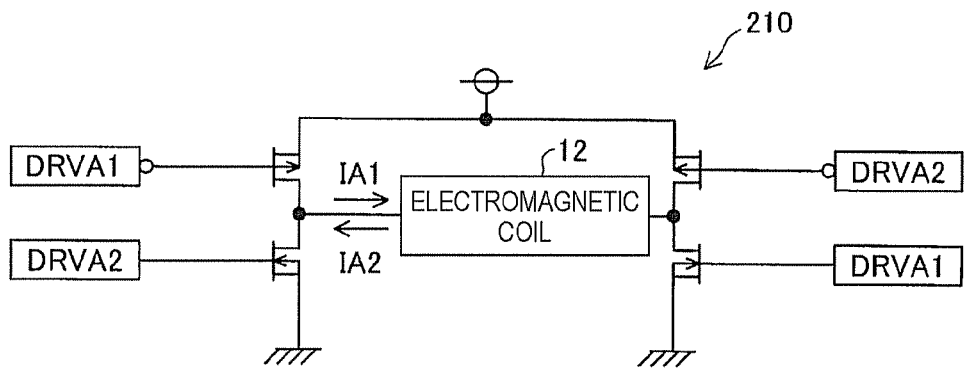
FIG. 15 is a circuit diagram showing the structure of a driving driver section.

FIG. 15 is a circuit diagram showing the structure of the driving driver section 210. The driving driver section 210 forms an H-type bridge circuit. The driving signal generation section 200 supplies either a first driving signal DRVA1 or a second driving signal DRVA2 to the driving driver section 210. Currents IA1 and IA2 shown in FIG. 15 indicate directions of currents (also called as "driving current") flowing in response to the driving signals DRVA1 and DRVA2. While only a circuit for one phase is described here for convenience, practically, the driving driver section 210 is adequately structured and driving signals are adequately set in accordance with the number of phases of the motor.

Figure 16:
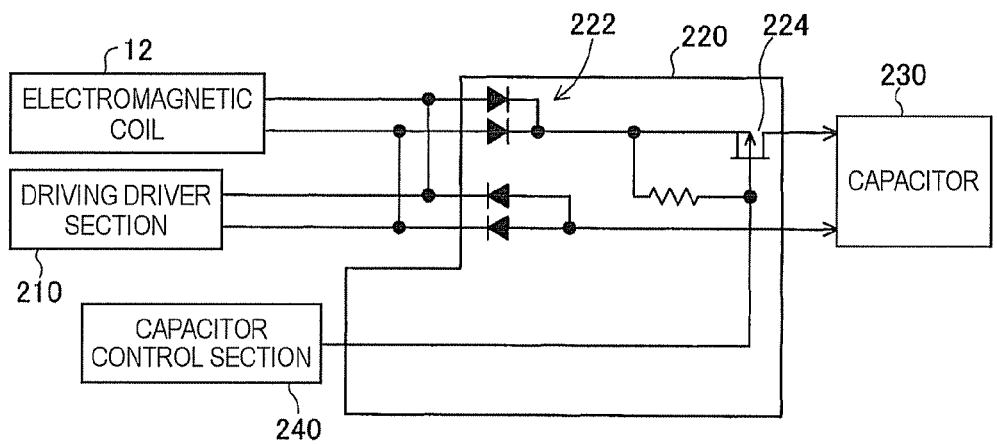
FIG. 16 is a circuit diagram showing the internal structure of a regeneration control section.

FIG. 16 is a circuit diagram showing an internal structure of the regeneration control section 220. The regeneration control section 220 is connected to the electromagnetic coil 12 in parallel with the driving driver section. The regeneration control section 220 includes a rectifying circuit 222 composed of diodes, and a switching transistor 224. When the switching transistor 224 is turned on by the capacitor control section 240, the capacitor 230 can be charged by regenerating power generated by the electromagnetic coil 12. In addition, a current can be supplied to the electromagnetic coil 12 from the capacitor 230. In this regard, the regeneration control section 220, the capacitor 230, and the capacitor control section 240 may be omitted, or the driving signal generation section 200 and the driving driver section 210 may be omitted.

D. MODIFICATION EXAMPLE

It should be understood that the invention is not limited to the above-mentioned examples and embodiments, but can be applied to various aspects without departing from the spirit and scope of the invention. For example, the following modifications can be made.

D1. Modification Example 1

In the above-described embodiments, the concrete examples of the mechanical structure and circuit structure of the brushless electric machine are described. The mechanical structure and the circuit structure of the brushless electric machine of the invention, however, can adopt any structure other than them. For example, while in the embodiments, the electromagnetic coil group for one phase are wholly provided between the two sets of permanent magnet groups, the electromagnetic coil group for one phase may be divided into a plurality of sets, instead of this, and the electromagnetic coil group in each set may be provided between the two sets of the permanent magnet groups. Specifically, for example, in a case of a two-phase motor, the A-phase coil group 12A may be divided into two sets of A-phase coil groups 12A1 and 12A2. Each of the two sets of the A-phase coil groups 12A1 and 12A2 is sandwiched by the two sets of the permanent magnet groups. The B-phase coil group is also structured in the same manner. This motor structure has a structure in which four sets of the coil groups 12A1, 12A2, 12B1, and 12B2 and five sets of the permanent magnet groups are provided and one set of the coil group and one set of the permanent magnet group are alternately disposed.

D2. Modification Example 2

The invention can be applied to the motor of various apparatuses such as fan motors, timepieces (driving hands), drum washing machines (single rotation), roller coasters, and vibration motors. In the case that the invention is applied to fan motors, various effects (low power consumptions, low vibrations, low noises, little rotational variations, low heat generations, and long life) are remarkably demonstrated. Such fan motors can be used as a fan motor for digital displays; in-vehicle devices; apparatuses using fuel batteries, such as fuel battery type personal computers, fuel battery type digital cameras, fuel battery type video cameras, and fuel battery type cell-phones; and projectors, for example. The motor of the invention also can be used as motors for various kinds of home electronics and electronic apparatuses. For example, the motor of the invention can be used as spindle motors of optical memory devices, magnetic memory devices, and polygon mirror driving devices. The motor of the invention also can be used as motors for mobile objects and robots.

Figure 17:
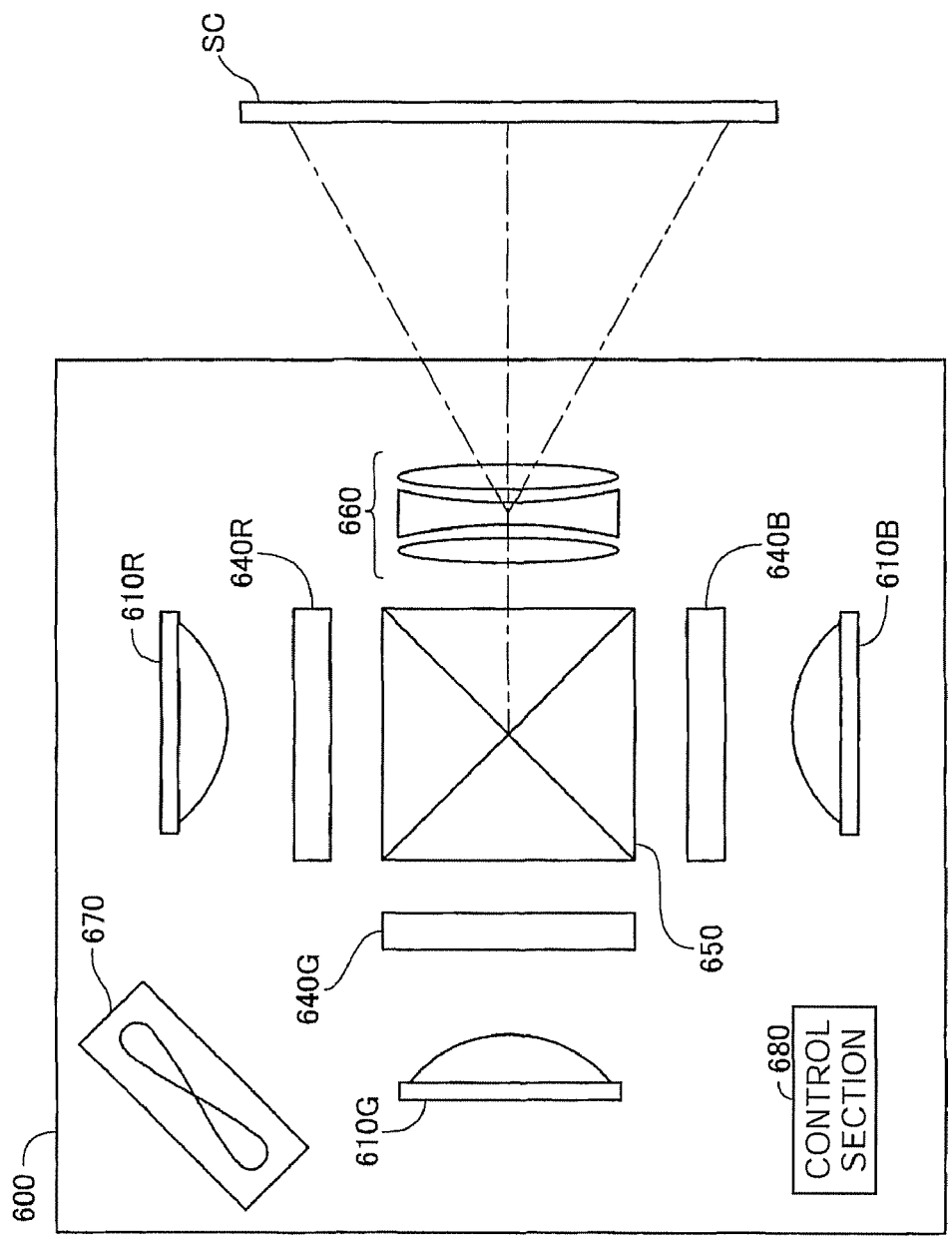
FIG. 17 is an explanatory view showing a projector utilizing the motor of application example of the invention.

FIG. 17 is an explanatory view showing a projector utilizing the motor of the application example of the invention. A projector 600 includes three light sources 610R, 610G, and 610B emitting color light of three colors of red, green, and blue, three liquid crystal light valves 640R, 640G, and 640B respectively modulating color light of the respective three colors, a cross dichroic prism 650 synthesizing modulated color light of the three colors, a projection lens system 660 projecting synthesized color light of the three colors to a screen SC, a cooling fan 670 to cool down the inside of the projector, and a control section 680 to control the projector 600 whole. The various kinds of brushless motors described above can be used as the motor to drive the cooling fan 670.

Figure 18A:
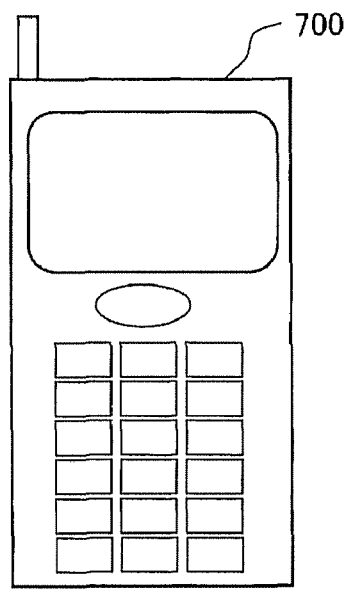
FIGS. 18A, 18B and 18C are explanatory views showing a fuel battery type cell-phone utilizing the motor of application example of the invention.
Figure 18B:
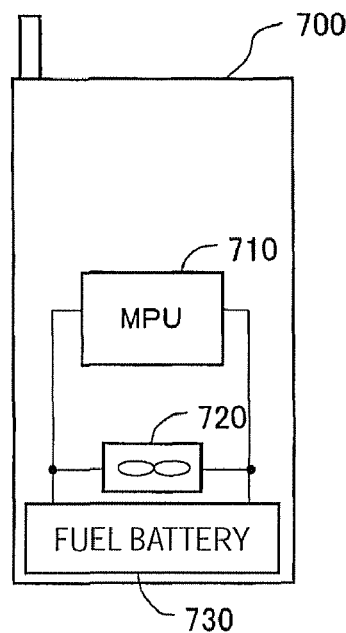
Figure 18C:
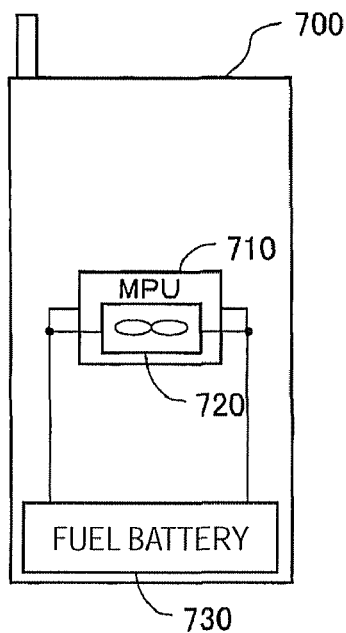

FIGS. 18A to 18C are explanatory views showing a fuel battery type cell-phone utilizing the motor of the application example of the invention. FIG. 18A shows the outer appearance of a cell-phone 700. FIG. 18B shows an example of the internal structure. The cell-phone 700 includes an MPU 710 controlling the operation of the cell-phone 700, a fan 720, and a fuel battery 730. The fuel battery 730 supplies a power source to the MPU 710 and the fan 720. The fan 720 sends wind inside the cell-phone 700 from an outside thereof to supply air to the fuel battery 730, or exhausts moisture produced in the fuel battery 730 to the outside of the cell-phone 700 from the inside thereof. The fan 720 may be disposed on the MPU 710 to cool down the MPU 710 as shown in FIG. 18C. The various kinds of brushless motors described above can be used as the motor to drive the fan 720.

Figure 19:
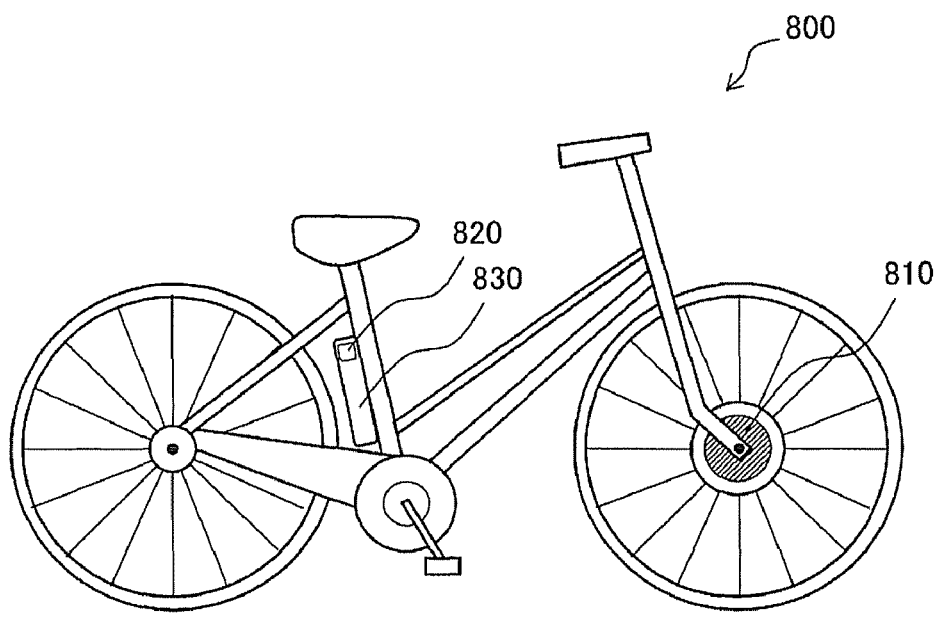
FIG. 19 is an explanatory view showing an electric bicycle (power assist bicycle) as an example of mobile objects utilizing the motor/generator of application examples of the invention.

FIG. 19 is an explanatory view showing an electric bicycle (power assist bicycle) as an example of mobile objects utilizing the motor/generator of the application example of the invention. A bicycle 800 has a motor 810 at the front wheel, and a control circuit 820 and a battery 830 on the frame under the saddle. The motor 810 drives the front wheel by utilizing power from the battery 830 to assist a run. During braking, power regenerated by the motor 810 is charged in the battery 830. The control circuit 820 controls driving and regeneration of the motor. The motor 810 can utilize the various kinds of brushless motors described above.

Figure 20:
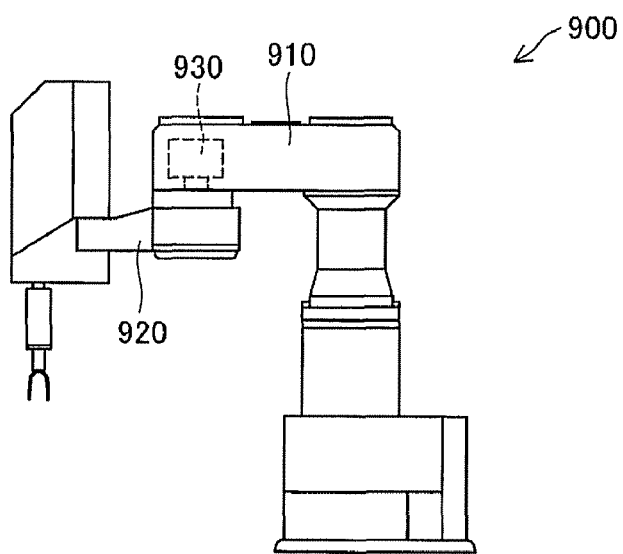
FIG. 20 is an explanatory view showing a robot using the motor of application example of the invention.
Figure 21:
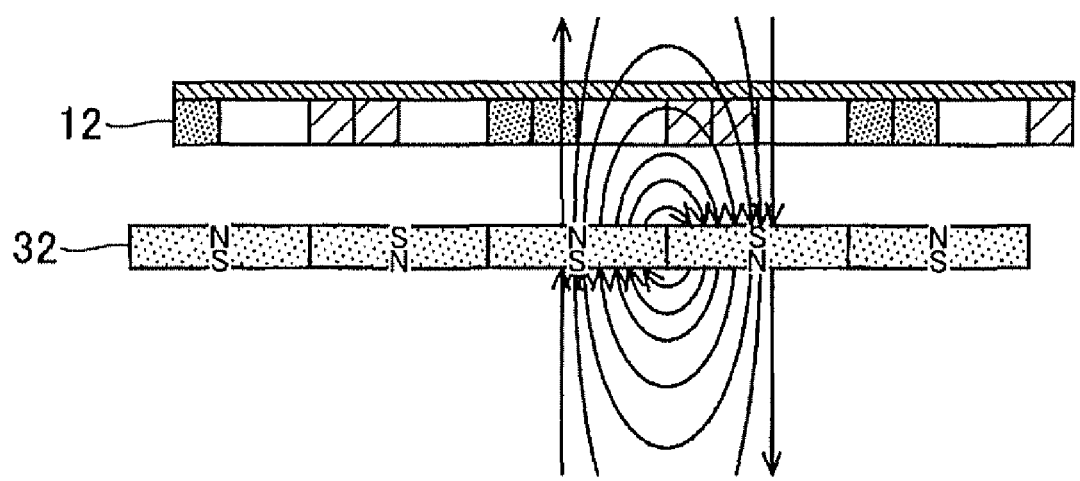
FIG. 21 is a conceptual view showing a structural example of a related art brushless motor.

FIG. 20 is an explanatory view showing a robot using the motor of the application example of the invention. A robot 900 has a first arm 910, a second arm 920, and a motor 930. The motor 930 is used in the case that the second arm 920 serving as a driven member is horizontally rotated. The motor 930 can utilize the various kinds of brushless motors described above.

The invention claimed is:

1. A brushless electric machine, comprising:
a first member that includes:
an A-phase electromagnetic coil group including A-phase coils disposed at a constant coil pitch and with adjacent coils excited in opposite directions; and
a B-phase electromagnetic coil group including B-phase coils disposed at the constant coil pitch and with adjacent coils excited in opposite directions;
the A-phase coils and the B-phase coils being disposed at positions having a phase difference of $\pi/2$; and
a second member that can move in a predetermined moving direction relative to the first member, the second member having sets of magnetic field forming member groups including:
a first permanent magnet group on a first side rotor section;
a second permanent magnet group on a central rotor section; and
a third permanent magnet group on a second side rotor section,
the first and second side rotor sections sandwiching the central rotor section therebetween, and
each of the first, second and third permanent magnet groups including a plurality of permanent magnets disposed at a constant magnetic pole pitch,
wherein the sets of magnetic field forming member groups are each disposed so that different magnetic poles face each other and create magnetic fields in the same direction having straight magnetic lines extending perpendicular to the moving direction,
wherein the A-phase coils are disposed between the first and second permanent magnet groups in a direction perpendicular to the moving direction, and the B-phase coils are disposed between the second and third permanent magnet groups in a direction perpendicular to the moving direction, and
wherein the magnetic pole pitch is equal to the coil pitch.

2. The brushless electric machine according to claim 1, wherein all of the sets of the magnetic field forming member groups are permanent magnet groups.

3. The brushless electric machine according to claim 1, further comprising:
a position sensor that is provided to the first member and detects a relative position of the first and second members; and
a control circuit that controls the brushless electric machine by utilizing an output signal of the position sensor.

4. A device, comprising:
the brushless electric machine according to claim 1; and
a driven member driven by the brushless electric machine.

5. A mobile object, comprising the brushless electric machine according to claim 1.

* * * * *